United States Patent [19]

Ziegler et al.

[11] Patent Number: 4,953,331
[45] Date of Patent: Sep. 4, 1990

[54] STATIONARY WINDOW ARRANGEMENT AT A MOTOR VEHICLE DOOR

[75] Inventors: Hermann Ziegler, Renningen; Horst Handte, Heimsheim; Walter Braun, Sindelfingen; Horst Gutzeit, Wiernsheim, all of Fed. Rep. of Germany

[73] Assignee: Dr. Ing. h.c.F. Porsche AG, Weissach, Fed. Rep. of Germany

[21] Appl. No.: 327,903

[22] Filed: Mar. 23, 1989

[30] Foreign Application Priority Data

Mar. 25, 1988 [DE] Fed. Rep. of Germany ....... 3810146

[51] Int. Cl.⁵ .............................................. E06B 3/00
[52] U.S. Cl. ........................................ 52/208; 52/781; 296/146; 296/201
[58] Field of Search ................. 52/208, 780, 781, 397, 52/400, 204; 296/201, 146; 49/391

[56] References Cited

U.S. PATENT DOCUMENTS

| 4,348,046 | 9/1982 | Ohya | 296/201 |
| 4,415,196 | 11/1983 | Baum et al. | 296/201 |
| 4,472,915 | 9/1984 | Smith | 52/204 |
| 4,614,058 | 9/1986 | Boykin | 49/391 |
| 4,621,469 | 11/1986 | Kruschwitz | 52/397 X |
| 4,697,841 | 10/1987 | Klein et al. | 296/201 X |
| 4,723,809 | 2/1988 | Kida et al. | 296/201 X |
| 4,765,673 | 8/1988 | Frabotta et al. | 296/201 X |
| 4,874,201 | 10/1989 | Scaglietti | 296/201 |

FOREIGN PATENT DOCUMENTS

| 1096019 | 12/1960 | Fed. Rep. of Germany . |
| 3718876 | 12/1978 | Fed. Rep. of Germany . |
| 71156 | 11/1952 | Netherlands | 52/397 |

Primary Examiner—Carl D. Friedman
Assistant Examiner—Lan Mai
Attorney, Agent, or Firm—Evenson, Wands, Edwards, Lenahan & McKeown

[57] ABSTRACT

A stationary window arrangement for a motor vehicle door is connected with an upright extending holding web by the interposition of a seal, and a holding rail being mounted at the lower edge area of the window. The holding web, the window, the holding rail, the seal, and an upper end piece for the holding web are prefabricated in a single operation to form a unit that is ready to be installed in the door.

6 Claims, 3 Drawing Sheets

STATIONARY WINDOW ARRANGEMENT AT A MOTOR VEHICLE DOOR

BACKGROUND AND SUMMARY OF THE INVENTION

The invention relates to a stationary window arrangement of a motor vehicle door which is connected with an upright extending holding web through the interposition of a sealing device and with a holding rail being mounted at the lower edge area of the window.

A stationary window arrangement of the initially mentioned type is known from German Patent Application P 37 18 876.3. In this construction, the holding rail is first connected with the window before the window is introduced into a seal inserted into the holding web in a subsequent operation. The seal must also be fastened at the holding web by means of gluing.

This type of a window arrangement requires high expenditures with respect to the assembly since several operations are required for its production. In order to achieve a sufficient grip of the pane at the holding web, a holder must also be arranged at the pane. The holder then has to be screwed together with the holding web.

It is the object of the invention to reduce the expenditures for such a stationary window arrangement and to also achieve a good fastening of the window at the holding web, while the construction is simple.

According to the invention, this object is achieved by having the window, the holding rail, the seal, the holding web and an upper end piece for the holding web prefabricated to form a unit which is produced in a single operation and is ready to be installed in the door. This is accomplished by having the seal formed by spraying an elastic, firmly adhesive layer made of rubber, a thermoplastic or duroplastic material around the window edge. This free-flowing layer fills a hollow space between the window edge and a receiving means of the holding web.

It is also advantageous if an upper end piece for the holding web is constructed in one piece with the seal and covers or projects beyond the upper end area of the holding web. The material for the fastening of the holding rail is the same material as that used for the making of the seal. Also exterior sides of the holding web are provided with a thin cover layer which is made of the same material and developed in one piece with the seal.

The main advantages achieved by means of the invention are that, by means of the ready-to-be-installed unit, which consists of the window, the holding rail, the seal, the holding web and the upper end piece and which was prefabricated in a single operation, the expenditures are reduced significantly. In addition, by injection-molding an end piece directly onto the upper end area of the holding web, a good fastening of the end piece is achieved. By means of the intimate connection of the seal with the window edge and the holding web, a secure hold is ensured of the window at the holding web, making an additional holder for the fastening of the pane unnecessary.

Other objects, advantages and novel features of the present invention will become apparent from the following detailed description of the invention when considered in conjunction with the accompanying drawings.

DETAILED DESCRIPTION OF THE DRAWINGS

Figure 1:
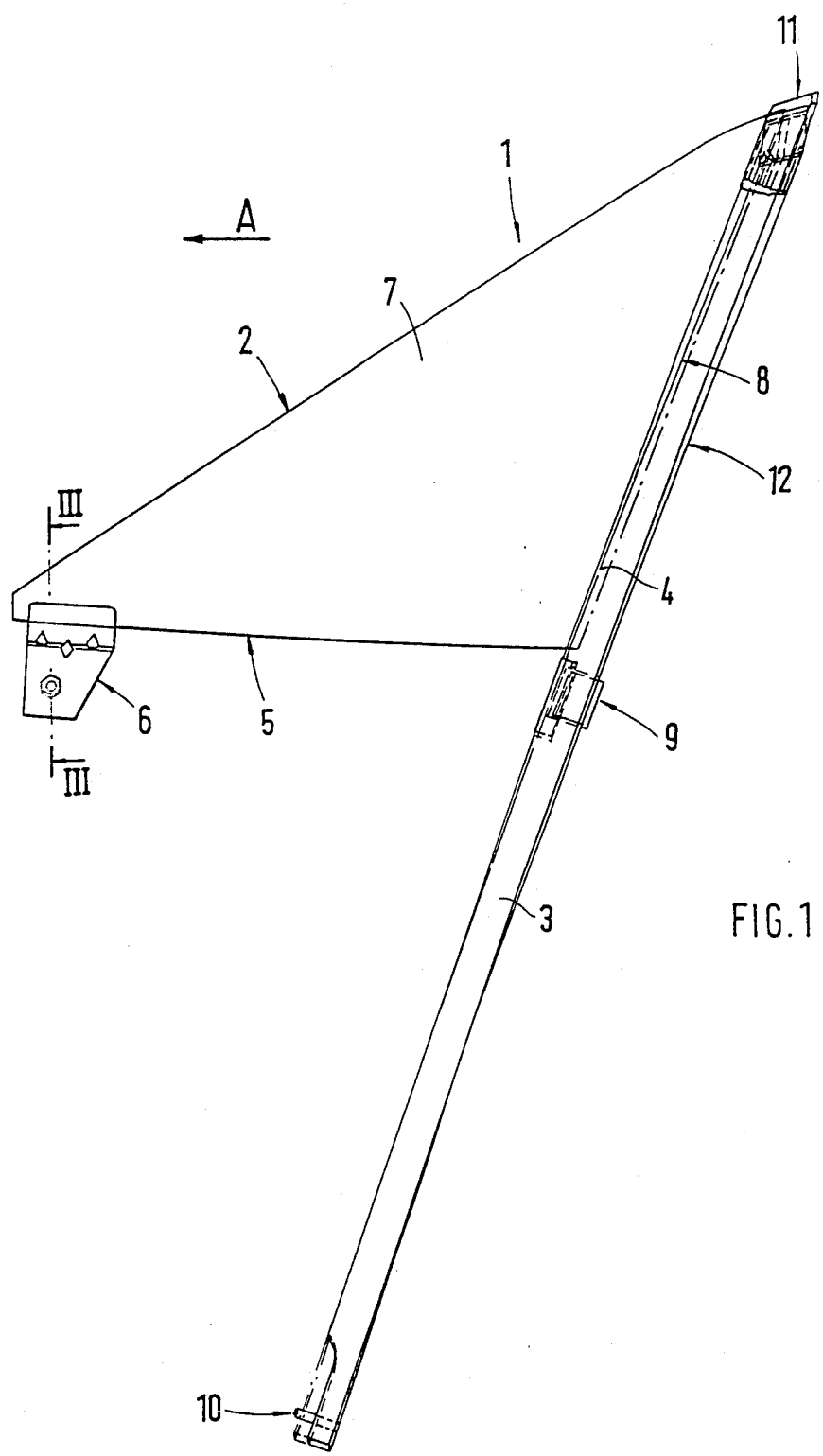
FIG. 1 is a lateral view of a stationary window arrangement.

FIG. 1 shows a stationary window arrangement 1 for a motor vehicle door, which is not shown in detail and which is composed of a window 2, an upright extending holding web 3, a seal 4 and a holding rail 6, which is mounted at the lower edge area 5 of the window 2. According to FIG. 1, the window 2 is formed by a hinged window 7, which interacts with the holding web 3 only at its diagonally extending edge area 8, which is located in the rear, viewed in driving direction A. The holding web 3, in a manner not shown in detail, is screwed together with the body of the door at 9 and 10.

A cost-effective manufacturing of the window arrangement 1 is achieved in that the window 2, the holding rail 6, the seal 4, the holding web 3 and an upper end piece 11 for the holding web 3 are prefabricated to form a unit 12 which is ready to be installed and which is produced in a single operation. The seal 4 is formed by spraying an elastic, firmly adhesive layer 14 made of rubber, a thermoplastic or a duroplastic material around the window edge 13, this free-flowing layer 14 filling in the hollow space 15 between the window edge 13 and a receiving means 16 of the holding web 3. The layer 14, which may, for example, consist of PVC, is placed in the hollow space 15 in a liquid form and hardens later, so that a vulcanizing of the layer 14 to the window 2 and the holding web 3 is achieved (FIG. 4).

Figure 2:
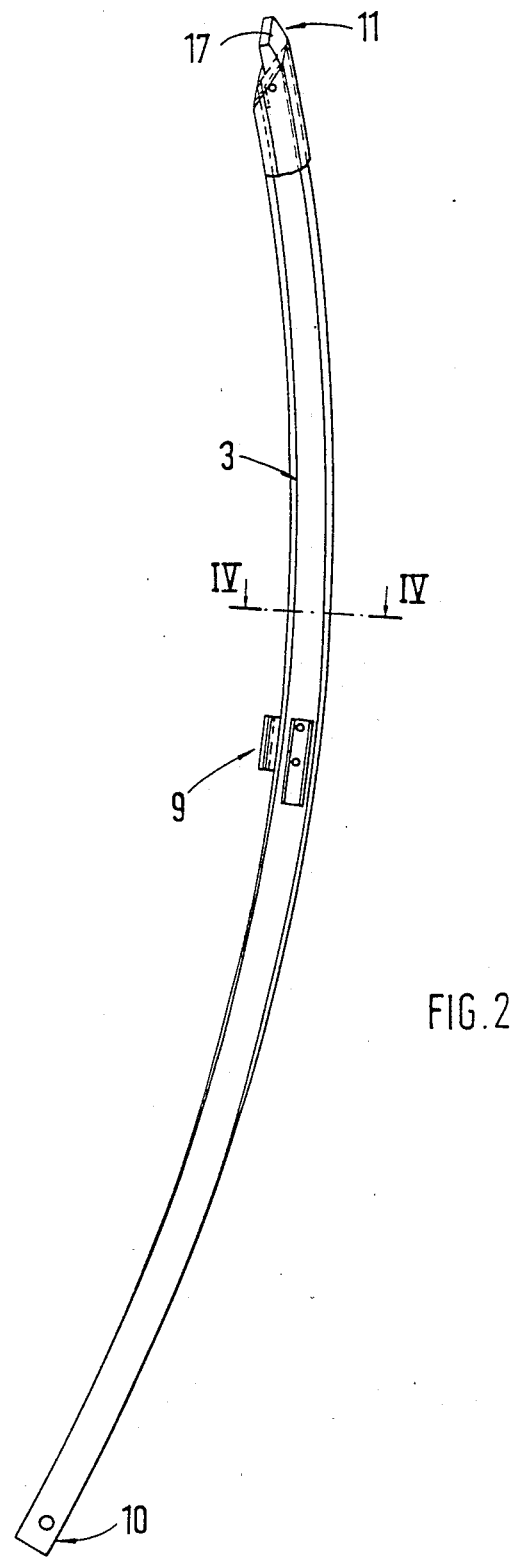
FIG. 2 is a view in the direction of the arrow A of FIG. 1.
Figure 3:
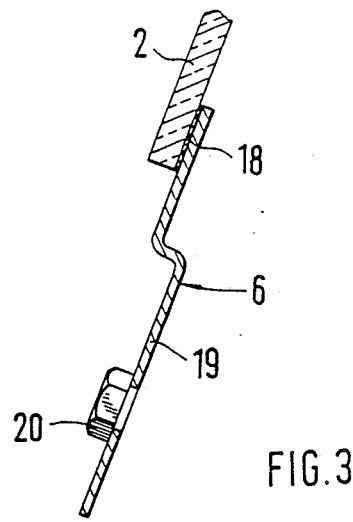
FIG. 3 is an enlarged sectional view according to Line III—III FIG. 1.

In addition, together with the seal 4, the upper end piece 11 is injection-molded-on. This upper end piece 11 covers an upper end area of the holding web 3 and has a sealing lip 17 (FIG. 2). The upper end piece 11 consists of the same material as the seal 4. The holding rail 6 located in the lower area of the window 2 is injection-molded to the window 2 in one operation together with the seal 4. In this case, rubber or PVC are also used as the adhesive layer 18. The holding rail 6 is formed by a bent sheet metal part 19 which, in sections, projects beyond the window 2 in downward direction. In addition, a weld nut 20 for the fastening of the window arrangement 1 is provided at the holding rail 6.

Figure 4:
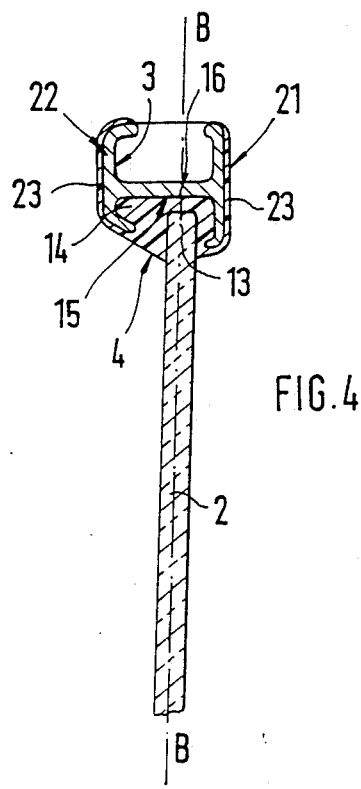
FIG. 4 is an enlarged sectional view according to Line IV—IV of FIG. 2.

According to FIG. 4, the two exterior sides 21, 22 of the holding web 3 which extend in sections approximately in parallel with respect to the window plane B—B, are provided with a thin cover layer 23. This cover layer 23 is developed in one piece with the seal 4 and consisting of the same material as the seal 4. However, the cover layer 23 for the holding web 3 may also be applied previously and may consist of a different material than layer 14. During the manufacturing of the window arrangement 1, the window 2, the holding rail 6 and the holding web 3 are placed in an injection mold. Then, in a single operation, the seal 4 with the upper end piece 11 and the holding rail 6 are injection-molded on.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A stationary window arrangement of a motor vehicle door comprising a window having a rear edge which is connected with an upright extending holding web by the interposition of a seal means, said holding web having an upper end piece, a holding rail being mounted at the lower edge area of the window and spaced from the holding web and seal means, wherein the window, the holding rail, the seal means, the holding web and said upper end piece for the holding web are prefabricated to form a preassembled unit which is assembled in a single operation and which is able to be installed in the vehicle door by attachment of the holding web and rail to the vehicle door.

2. A stationary window arrangement according to claim 1, wherein the seal is formed by spraying an elastic, firmly adhesive layer made of any one of rubber, a thermoplastic or duroplastic material around an edge of the window, and wherein this free-flowing layer fills in a hollow space between the window edge and a receiving means of the holding web.

3. A stationary window arrangement according to claim 1, wherein the upper end piece for the holding web is constructed in one piece with the seal means and at least covers or projects beyond the upper end area of the holding web.

4. A stationary window arrangement according to claim 1, wherein that holding rail is fastened to the window with the same material used for the making of the seal means.

5. A stationary window arrangement according to claim 1, wherein exterior sides of the holding web are provided with a thin cover layer.

6. A stationary window arrangement according to claim 5, wherein the cover layer is made of the same material as the seal means and is developed in one piece with the seal means.

* * * * *